US006576799B1

(12) United States Patent
Miller et al.

(10) Patent No.: US 6,576,799 B1
(45) Date of Patent: Jun. 10, 2003

(54) PROCESS FOR PREPARING ETHER-CAPPED POLY(OXYALKYLATED) ALCOHOL SURFACTANTS

(75) Inventors: Larry Eugene Miller, Cincinnati, OH (US); Donald Eugene Levengood, West Chester, OH (US); Mark Robert Sivik, Ft. Mitchell, KY (US); Bernard William Kluesener, Harrison, OH (US); Terry Franklin Formyduval, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/831,116

(22) PCT Filed: Nov. 3, 1999

(86) PCT No.: PCT/US99/25944

§ 371 (c)(1),
(2), (4) Date: May 4, 2001

(87) PCT Pub. No.: WO00/27903

PCT Pub. Date: May 18, 2000

Related U.S. Application Data

(60) Provisional application No. 60/131,409, filed on Apr. 28, 1999, now abandoned, and provisional application No. 60/107,170, filed on Nov. 5, 1998, now abandoned.

(51) Int. Cl.[7] ............................................. C07C 41/09
(52) U.S. Cl. ...................... 568/608; 568/609; 568/616; 568/618; 568/620; 568/622; 568/625
(58) Field of Search .................. 568/608, 609, 568/616, 618, 620, 622, 625

(56) References Cited

U.S. PATENT DOCUMENTS

| 3,927,067 A | 12/1975 | Cantor et al. |
| 4,248,729 A | 2/1981 | Rubingh et al. |
| 4,272,394 A | 6/1981 | Kaneko |
| 4,284,532 A | 8/1981 | Leikhim et al. |
| 4,627,927 A | 12/1986 | Sakatani et al. |
| 4,770,815 A | 9/1988 | Baker et al. |
| 4,790,856 A | 12/1988 | Wixon |
| 4,804,492 A | 2/1989 | Bernarducci |
| 5,035,814 A | 7/1991 | Maaser |
| 5,047,165 A | 9/1991 | Lysy et al. |
| 5,294,365 A | 3/1994 | Welch et al. |
| 5,419,853 A | 5/1995 | Kemen |
| 5,648,557 A | 7/1997 | Wei |
| 6,482,994 B2 * | 11/2002 | Scheper et al. ............. 568/625 |
| 6,495,727 B1 * | 12/2002 | Jordan, IV et al. ......... 568/618 |

FOREIGN PATENT DOCUMENTS

| DE | 2 225 318 | 12/1973 |
| EP | 0 342 177 B1 | 11/1989 |
| GB | 2144763 A | 3/1985 |
| GB | 2154599 A | 9/1985 |
| WO | WO 92/06150 A1 | 4/1992 |
| WO | WO 93/04153 A1 | 3/1993 |
| WO | WO 94/22800 A1 | 10/1994 |
| WO | WO 97/22651 A1 | 6/1997 |
| WO | WO 99/06467 A1 | 2/1999 |
| WO | WO 99/06468 A1 | 2/1999 |

OTHER PUBLICATIONS

Condon, B.D., "Glyceryl Bisether Sulfates. I: Improved Synthesis"; J. Amer. Chem. Soc., vol. 71, No. 7 pp. 739–741 (Jul. 1994).

* cited by examiner

*Primary Examiner*—Rosalynd Keys
(74) *Attorney, Agent, or Firm*—Kevin L. Waugh; Kim W. Zerby; Steven W. Miller

(57) ABSTRACT

A process for preparing an ether-capped poly(oxyalkylated) alcohol surfactant which results in the absence of metallic catalyst component residues from the ether-capped poly(oxyalkylated) alcohol surfactant.

22 Claims, No Drawings

PROCESS FOR PREPARING ETHER-CAPPED POLY(OXYALKYLATED) ALCOHOL SURFACTANTS

This Application claims the benefit of PCT application No. US99/25944, published as WO 00/27903 filed on Nov. 3, 1999, which in turn claims the benefit of U.S. Provisional Application Ser. No. 60/131,409 filed on Apr. 28, 1999, (now abandoned), which in turn claims the benefit of U.S. Provisional Application No. 60/107,170, filed on Nov. 5, 1998, (now abandoned).

TECHNICAL FIELD

The present invention relates to an industrial process for preparing low-foaming nonionic surfactants and more particularly to a process for preparing ether-capped poly (oxyalkylated) alcohol surfactants which have superior spotting and filming benefits in dishwashing and hard surface cleaning applications, as well as suds suppression in detergent compositions.

BACKGROUND OF THE INVENTION

Ether-capped poly(oxyalkylated) alcohols can be prepared using various catalysts, such as Lewis acids. However, for industrial production, metallic catalysts, such as stannic chloride is preferred. In addition to being an excellent catalyst for the reaction of a glycidyl ether with ethoxylated alcohol, metallic catalysts are economical and readily available in commercial bulk quantities. They also offer safety and ease of handling advantages on an industrial scale versus alternative catalysts. One important disadvantage for metallic catalysts is that the soluble metallic residue component of the catalyst, such as tin residues when is the catalyst $SnCl_4$, resulting from there use as reaction catalyst, generally cannot be tolerated above about 100 ppm in many cleaning formulations and applications and these residues are difficult and expensive to remove from ether-capped poly(oxyalkylated) alcohol compositions. Successful laboratory approaches to removal of residual metallic catalyst component, such as the use of a silica gel plug and eluting with a 5% methanol in dichloromethane solution leads to complexity and high cost on an industrial production scale. Due to the surfactant properties of the ether-capped poly (oxyalkylated) alcohol, water washing for metallic catalyst component removal leads to emulsification problems leading to complex organic—aqueous separations.

Consequently, the problem remains that there is no commercially viable or industrial scale process for the removal of these metallic catalyst component residues from the ether-capped poly(oxyalkylated) alcohol compositions.

BACKGROUND ART

U.S. Pat. No. 4,272,394, issued Jun. 9, 1981, U.S. Pat. No. 5,294, 365, issued Mar. 15, 1994 U.S. Pat. No. 4,248,729, issued Feb. 3, 1981; U.S. Pat. No. 4,284,532, issued Aug. 18, 1981; U.S. Pat. No. 4,627,927, issued Dec. 9, 1986; U.S. Pat. No. 4,790,856, issued Dec. 13, 1988; U.S. Pat. No. 4,804, 492, issued Feb. 14, 1989; U.S. Pat. No. 4,770,815, issued Sep. 13, 1989; U.S. Pat. No. 5,035,814, issued Jul. 30, 1991; U.S. Pat. No. 5,047,165, issued Sep. 10, 1991; U.S. Pat. No. 5,419,853, issued May 30, 1995; U.S. Pat. No. 5,294,365, issued Mar. 15, 1994; GB Application No. 2,144,763, published Mar. 13, 1985; GB Application No. 2,154,599, published Sep. 9, 1985; WO Application No. 9,296,150, published Apr. 16, 1992; WO 94/22800, published Oct. 13, 1994, WO 93/04153, published Mar. 4, 1993, WO 97/22651, published Jun. 26, 1997, EP Application No. 342,177, published Nov. 15, 1989 and "Glyceryl Bisether Sulfates. 1: Improved Synthesis" Brian D. Condon; Journal Of the American Chemical Society, Vol. 71, no. 7 (July 1994).

SUMMARY OF THE INVENTION

A process for removing metallic catalyst component residues from the ether-capped poly(oxyalkylated) alcohol reaction product has been discovered that is simple and economical to practice on an industrial scale. It has been discovered that selected aqueous solutions can be used to effectively extract the metallic catalyst component residues from ether-capped poly(oxyalkylated) alcohol while avoiding oil and water phase emulsification. This extraction method of purification avoids organic solvents, costly process aids, process complexity and provides a simple, economic industrial route to remove the metallic catalyst component residues in ether-capped poly(oxyalkylated) alcohols to below about 100 ppm. This residue extraction can be carried out as either a batch or continuous process. Furthermore, the residue can be removed in a single or multiple extraction steps.

In accordance with a first aspect of the present invention, a process for preparing an ether-capped poly(oxyalkylated) alcohol surfactant is provided. The surfactant has the formula:

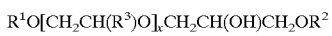

wherein $R^1$ and $R^2$ are linear or branched, saturated or unsaturated, aliphatic or aromatic hydrocarbon radicals having from about 1 to about 30 carbon atoms; $R^3$ is H, or a linear aliphatic hydrocarbon radical having from about 1 to about 4 carbon atoms; x is an integer having an average value from 1 to about 30, wherein when x is 2 or greater, $R^3$ may be the same or different, independently H, or $C_1$ to $C_4$ in any given molecule, further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof. The process comprises the steps of:

(a) providing a glycidyl ether having the formula:

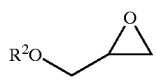

wherein $R^2$ is defined as above;
(b) providing an ethoxylated alcohol having the formula:

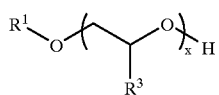

wherein $R^1$, $R^3$ and x are defined as above; and
(c) reacting the glycidyl ether with the ethoxylated alcohol to form the surfactant in the presence of a metallic catalyst;
(d) said surfactant is sparged with an inert gas, preferably $N_2$, Ar and mixtures thereof, optionally under vacuum, preferably a vacuum in the range of 5 to 500 mmHg; and (e) extracting said catalyst from said surfactant by at least one aqueous extraction with an aqueous solution, wherein said aqueous solution is selected from the group consisting of a from about 2% to about 15% by weight aqueous solution of sodium carbonate, a from about 2% to about 10% by weight aqueous solution of potassium carbonate, a from about 1% to about 22% by weight aqueous solution of sodium sulfate, a from about 2% to about 6% by weight aqueous solution of sodium bicarbonate, a from about 1% to about 10% by weight aqueous solution of potassium sulfate, a from about 2% to about 24% by weight aqueous solution of potassium bicarbonate, and mixtures thereof; and wherein said surfactant, after said at least one aqueous extraction, contains less than about 100 ppm of the metallic component of said metallic catalyst.

$R^1$ and $R^2$ are preferably a linear or branched, saturated or unsaturated, aliphatic hydrocarbon radical having from about 6 to about 22 carbon atoms and x is an integer having an average value of from about 6 to about 15.

The step of reacting the glycidyl ether with the ethoxylated alcohol is preferably conducted at a temperature of from about 50° C. to about 95° C. with 60° C. to about 80° C. even more preferred when Lewis acid catalysts are employed.

The step of providing the glycidyl ether may further comprise the step of reacting a linear aliphatic or aromatic alcohol having the formula $R^2OH$ and an epoxide having the formula:

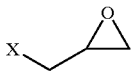

wherein $R^2$ is defined as above and X is a leaving group. This reaction may also be conducted in the presence of a catalyst as defined above. The catalyst is typically employed at levels of about 0.1 mol % to about 2.0 mol % and the reaction is preferably conducted in the absence of a solvent at temperatures of from about 40° C. to about 90° C.

As already noted, the surfactants have advantages, including superior spotting and filming reduction benefits as well as excellent greasy soil removal, good dishcare, suds suppression and good overall cleaning.

Accordingly, it is an aspect of the present invention to provide a process for producing a low-foaming nonionic surfactant having superior spotting and filming reduction benefits as well as excellent greasy soil removal, good dishcare, suds suppression and good overall cleaning. It is a further aspect of the present invention to provide a process for producing an ether-capped poly(oxyalkylated) alcohol surfactant. It is a further aspect of the present invention to provide a low-foaming nonionic surfactant produced by the process of the present invention. These and other aspects, features and advantages will be apparent from the following description and the appended claims.

In the description of the invention various embodiments and/or individual features are disclosed. As will be apparent for the skilled practitioner all combinations of such embodiments and features are possible and can result in preferred executions of the invention.

All parts, percentages and ratios used herein are expressed as percent weight unless otherwise specified. All documents cited are, in relevant part, incorporated herein by reference.

DETAILED DESCRIPTION OF THE PREFERRED EMBODIMENTS

Once again, the present invention is directed toward a process for producing a low-foaming nonionic surfactant for use in detergent compositions.

The novel surfactants of the present invention comprise ether-capped poly(oxyalkylated) alcohols having the formula:

wherein $R^1$ and $R^2$ are linear or branched, saturated or unsaturated, aliphatic or aromatic hydrocarbon radicals having from about 1 to about 30 carbon atoms; $R^3$ is H, or a linear aliphatic hydrocarbon radical having from about 1 to about 4 carbon atoms; x is an integer having an average value from 1 to about 30, wherein when x is 2 or greater $R^3$ may be the same or different and k and j are integers having an average value of from about 1 to about 12, and more preferably 1 to about 5, further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof.

$R^1$ and $R^2$ are preferably linear or branched, saturated or unsaturated, aliphatic or aromatic hydrocarbon radicals having from about 6 to about 22 carbon atoms with about 8 to about 18 carbon atoms being most preferred. Additionally, $R^2$ may be selected from hydrocarbon radicals which are ethoxylated, propoxylated and/or butoxylated. H or a linear aliphatic hydrocarbon radical having from about 1 to about 2 carbon atoms is most preferred for $R^3$. Preferably, x is an integer having an average value of from about 1 to about 20, more preferably from about 6 to about 15.

As described above, when, in the preferred embodiments, and x is greater than 2, $R^3$ may be the same or different. That is, $R^3$ may vary between any of the alkyleneoxy units as described above. For instance, if x is 3, $R^3$ may be selected to form ethyleneoxy (EO) or propyleneoxy (PO) and may vary in order of (EO)(PO)(EO), (EO)(EO)(PO); (EO)(EO)(EO); (PO)(EO)(PO); (PO)(PO)(EO) and (PO)(PO)(PO). Of course, the integer three is chosen for example only and the variation may be much larger with a higher integer value for x and include, for example, multiple (EO) units and a much small number of (PO) units. However, when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl.

Particularly preferred surfactants as described above include those that have a low cloud point of less than about 20° C. These low cloud point surfactants may then be employed in conjunction with a high cloud point surfactant as described in detail below for superior grease cleaning benefits.

Most preferred according to the present invention are those surfactants wherein k is 1 and j is 1 so that the surfactants have the formula:

where $R^1$, $R^2$ and $R^3$ are defined as above and x is an integer with an average value of from about 1 to about 30, preferably from about 1 to about 20, and even more preferably from about 6 to about 18. Most preferred are surfactants wherein $R^1$ and $R^2$ range from about 9 to about 15, $R^3$ is H forming ethyleneoxy and x ranges from about 6 to about 15.

Basically, the alcohol surfactants of the present invention comprise three general components, namely a linear or branched alcohol, an alkylene oxide and an alkyl ether end cap. The alkyl ether end cap and the alcohol serve as a hydrophobic, oil-soluble portion of the molecule while the alkylene oxide group forms the hydrophilic, water-soluble portion of the molecule.

It has been surprisingly discovered in accordance with the present invention that significant improvements in spotting and filming characteristics and, when used in conjunction with high cloud point surfactants, in the removal of greasy soils relative to conventional surfactants, are provided via the ether-capped poly(oxyalkylene) alcohol surfactants of the present invention.

It has been surprisingly discovered that the ether-capped poly(oxyalkylene) alcohol surfactants of the present invention in addition to delivering superior cleaning benefits also provide good suds control. This suds control can be clearly seen in the presence of high sudsing surfactants, such as amine oxides, or in the presence of high sudsing soils, such as proteinaceous or egg soils.

Generally speaking, the ether-capped poly(oxyalkylene) alcohol surfactants of the present invention may be produced by reacting an aliphatic alcohol with an epoxide to form an ether which is then reacted with a base to form a second epoxide. The second epoxide is then reacted with an alkoxylated alcohol to form the ether-capped poly(oxyalkylene) alcohol surfactants of the present invention. The product of the process is a purified mixture of ether-capped poly(oxyalkylene) alcohol surfactants. The present invention is also directed to the product, namely the purified mixture of ether-capped poly(oxyaLkylene) alcohol surfactants produced by the present method.

The process comprises the first step of providing a glycidyl ether having the formula:

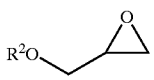

where $R^2$ is defined as above. Various glycidyl ethers are available from a number of commercial sources including the Aldrich Chemical Company. Alternatively, the glycidyl ether may be formed from the reaction of a linear or branched, aliphatic or aromatic alcohol of the formula $R^2OH$ where $R^2$ is defined as above and an epoxide of the formula:

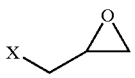

where X is a suitable leaving group. While a number of leaving groups may be employed in the present invention, X is preferably selected from the group consisting of halides including chloride, bromide, and iodide, tosylate, mesylate and brosylate, with chloride and bromide being even more preferred with chloride being the most preferred (e.g. epichlorohydrin).

The linear or branched alcohol and the epoxide are preferably reacted at ratios ranging from about 0.5 equivalents alcohol to 2.5 equivalents epoxide with 0.95 equivalents alcohol to 1.05 equivalents epoxide more typical under acidic conditions for catalysis purposes. The catalyst is a metallic catalyst. The term "metallic catalyst", includes within its definition catalysts which include a metallic a component. This definition includes both salts, such as $AlCl_3$, etc., and covalent compounds, such as $BF_3$, $SnCl_4$, etc., which include a metallic component. The metallic component includes all elements commonly know as metals, such as alkali metals, alkaline earth metals, transition metals, and Boron.

Suitable catalysts include, but are not limited to, $TiCl_4$, $Ti(O^iPr)_4$, $ZnCl_2$, $SnCl_4$, $SnCl_2$, $FeCl_3$, $AlCl_3$, and mixtures thereof, more preferably $SnCl_4$. The metallic catalyst are preferably Lewis acids. Suitable Lewis acid catalysts include, but are not limited to, $SnCl_4$, $BF_3$, $AlCl_3$, and mixtures thereof. The metallic components of these preferred catalysts are Ti, Zn, Fe, Sn, B, and Al. The metallic Lewis acid, are preferably employed at amounts of about 0.1 mol % to about 2.0 mol % with about 0.2 mol % to about 1.0 mol % being more typical.

While the reaction may be conducted in the presence of a suitable solvent such as benzene, toluene, dichloromethane, tetrahydrofuran, diethylether, methyl tert-butylether or the like, the reaction is preferably conducted neat or in the absence of solvent.

Lastly, the reaction is conducted at temperatures preferably ranging from about 40° C. to about 90° C., more preferably from about 50° C. to about 80° C.

Before the extraction of the catalyst from the surfactant, the surfactant is either sparged with an inert gas, preferably, nitrogen, argon or mixtures thereof or placed under a vacuum, to remove any oxygenated impurities which were formed during the reaction. These impurities are those typically associated with any ethoxylation processes, such as ethanol, ethylene glycol, diethylene glycol, etc. It is further preferred that the sparging is performed under a vacuum, preferably a vacuum in the range of 5 to 500 mmHg. It is further preferred that the sparging is performed for at least 30 minutes, more preferably at least 90 minutes. It is further preferred that the sparging is performed at a temperature of about 50° C. to about 100° C., more preferably at a temperature of 60° C. to about 70° C.

Upon completion of the reaction, the mixture is treated with a basic material to form the glycidyl ether. The basic material is preferably a strong base such as a hydroxide. Preferred hydroxides include alkali metal hydroxides with sodium being the typical choice. However, one of ordinary skill in the art will recognize that other basic materials may also be employed. The basic material is preferably added at levels of from about 0.5 equivalents to about 2.5 equivalents, with about 0.95 equivalents to about 2.0 equivalents being more preferred.

The product glycidyl ether may then be collected after optional filtration, drying and distillation according to the methods well-known in the art.

To form the surfactant, an ethoxylated alcohol having the formula:

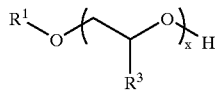

wherein $R^1$ and x are defined as before in an amount of from about 0.80 to about 2.0 equivalents is combined with the metallic catalyst and heated to a temperature ranging from about 50° C. to about 95° C. and more preferably from about 60° C. to about 80° C. when a Lewis acid catalyst is employed. The glycidyl ether is then added to the mixture and reacted for from about 0.5 hours to about 30 hours, more preferably from about 1 hour to about 24 hours.

The metallic component of the catalyst is then extracted from the ether-capped poly(oxyalkylated) alcohol surfactant product by at least one aqueous extraction with an aqueous solution. The aqueous solution is selected from the group consisting of a from about 2% to about 15% by weight aqueous solution of sodium carbonate, a from about 2% to about 10% by weight aqueous solution of potassium carbonate, a from about 1% to about 22% by weight aqueous solution of sodium sulfate, a from about 2% to about 6% by weight aqueous solution of sodium bicarbonate, a from about 1% to about 10% by weight aqueous solution of potassium sulfate, a from about 2% to about 24% by weight aqueous solution of potassium bicarbonate, and mixtures thereof. The extraction may be either batch or continuous. It has surprisingly found that aqueous extractions with aqueous solutions containing salts, or combinations of salts other than those listed above do not reduce the metallic component of the ether-capped poly(oxyalkylated) alcohol surfactant product. Examples of unsuitable salts are sodium chloride, calcium carbonate, and sodium hydroxide.

Multiple extractions of the ether-capped poly(oxyalkylated) alcohol surfactant product may occur and are preferred. After the at least one aqueous extraction the ether-capped poly(oxyalkylated) alcohol surfactant product, contains less than about 100 ppm, preferably less than about 70 ppm, more preferably less than about 25 ppm, more preferably less than about 10 ppm of the metallic component of the metallic catalyst.

A representative synthetic route is demonstrated via the following diagram and examples.

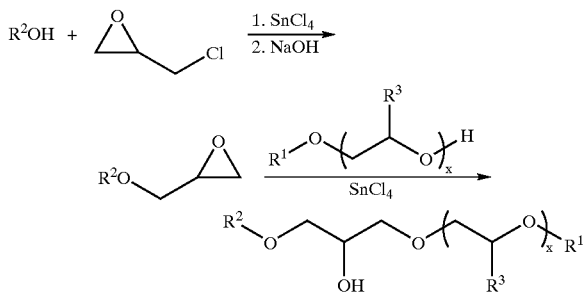

EXAMPLES

1. Preparation of $C_{12/14}$-alkyl-$C_{11/15}$-alkyl Ethoxylated Ether Capped Alcohol Surfactant Tergitol® 15-S-15 (150.0 g, 0.174 mol) is melted and added into a 500 ml four-necked round bottom flask fitted with a condenser, nitrogen inlet, addition funnel, mechanical stirrer and internal thermometer. The contents of the flask are dried at 75° C. for 30 minutes under vacuum. An a nitrogen atmosphere is established. Stannic chloride (1.43 g) is added to the flask via syringe. The mixture is heated to 85° C. $C_{12/14}$-alkyl glycidyl ether (89.2 g, 0.348 mol) is added dropwise over 1 hour, maintaining the reaction temperature. After stirring for an additional 60 minutes at 75° C., the reaction is cooled to 60° C. then quenched with the addition of 10 ml of water. The reaction product contains 2100 ppm tin by elemental analysis.

Removal of Tin from Reaction Product of Example 1

1A. 15 g of 65° C. distilled water is added to a 125 ml separatory funnel followed by a 15 g aliquot of $C_{12/14}$-alkyl-$C_{11/15}$-alkyl ethoxylated ether capped alcohol from Example 1 above is preheated to 65° C. Following moderate shaking, the organic and aqueous phases will not separate.

1B. A solution containing 15% by weight sodium chloride in distilled water is preheated to 65° C. A 15 g aliquot is added to a 125 ml separatory funnel followed by a 15 g aliquot of $C_{12/14}$-alkyl-$C_{11/15}$-alkyl ethoxylated ether capped alcohol from Example 1 above is also preheated to 65° C. Following moderate shaking, the organic and aqueous phases will separate readily upon standing. The organic layer has a tin content of 2100 ppm by elemental analysis.

1C. A solution containing 15% by weight sodium carbonate in distilled water is preheated to 65° C. A 15 g aliquot is added to a 125 ml separatory funnel followed by a 15 g aliquot of $C_{12/14}$-alkyl-$C_{11/15}$-alkyl ethoxylated ether capped alcohol from Example 1 above is also preheated to 65° C. Following moderate shaking, the organic and aqueous phases will separate readily. The organic layer has a tin content of 90 ppm by elemental analysis.

1D. The quenched reaction product obtained in Example 1, namely the $C_{12/14}$-alkyl-$C_{11/15}$-alkyl ethoxylated ether capped alcohol from Example 1, is placed in a 125 ml separatory funnel. 15 g of a 65° C. solution of 15% by weight sodium carbonate in distilled water is then added to the funnel. Following moderate shaking, the organic and aqueous phases will separate upon standing. The organic layer has a tin content of 90 ppm by elemental analysis.

Example 2

Tergitol® 15-S-15 (7517 g, 8.74 mol) is melted and added into a 22 L three necked round bottom flask fitted with a condenser, nitrogen inlet, addition funnel, mechanical stirrer and internal thermometer. The contents of the flask are dried at 75° C. for 2.5 hours utilizing a nitrogen sparge. A nitrogen atmosphere is maintained. Stannic chloride (150 g) is added to the flask via syringe. The mixture is heated to 85° C. $C_{12/14}$-alkyl glycidyl ether (4467 g, 17.48 mol) is added dropwise over 1 hour, maintaining the reaction temperature. After stirring for an additional 60 minutes at 75° C., the reaction is cooled to 60° C. then quenched with the addition of water (150 ml). The reaction product contains 5000 ppm tin by elemental analysis.

Removal of Tin from Reaction Product of Example 2

2A. 15 g of the reaction product from Example 2 is extracted with an equal weight of a 5% aqueous solution of sodium carbonate by the method given in example 1C. The layers separates in approximately 30 seconds. The organic layer contains 230 ppm tin. The resulting organic layer is then extracted a second time with an equal weight of a 5% aqueous solution of sodium carbonate. The layers separate in approximately 30 seconds. The organic layer contains 15 ppm tin.2B. Following the method of Example 2A, a 15% sodium chloride and 5% sodium hydroxide solution is used. The tin content of the organic layer is 2100 ppm.

2C. Following the method of Example 2A, a 5% solution of potassium carbonate is used. The tin content of the organic layer is 90 ppm.

2D. Following the method of Example 2A, a 5% solution of calcium carbonate is used. The organic and aqueous phases will not separate upon standing.

2E. Following the method of Example 2A, a 5% solution of sodium sulfate is used. The layers will separate in approximately 45 seconds upon standing. The tin content of the organic layer is 69 ppm.

2F. Following the method of Example 2A, a 5% solution of sodium bicarbonate is used. Phase separation occurs in approximately one minute. The tin content of the organic layer is 23 ppm.

Example 3

12 kg of $C_{12/14}$-alkyl-$C_{11/15}$-alkyl ethoxylated ether capped alcohol reaction product (5000 ppm tin) at 58° C. is added into a 20 gallon stainless steel tank equipped with heating coils and a pitched turbine mechanical agitator. 12 kg of 15% sodium carbonate solution at 50° C. is added. The liquid contents are mixed for 5 minutes using the turbine mixer. The mixer is then shut off and the layers are allowed to settle over a period of thirty minutes while the temperature is maintained with hot water flow through the heating coil. The aqueous layer is drained from the bottom leaving an organic layer with a tin content of 71 ppm. A second extraction of the organic layer using 12 kg of 15% sodium carbonate solution at 50° C. is carried out. The tin content of the organic layer following the second extraction is <10 ppm.

From the aforementioned surfactants, a cleaning composition, and in particular, a dish or hard surface cleaning composition may be designed. The compositions can optionally include one or more other detergent adjunct materials or other materials for assisting or enhancing cleaning performance, treatment of the substrate to be cleaned, or to modify the aesthetics of the detergent composition (e.g., perfume, colorants, dyes, etc.). The following are illustrative examples of such adjunct materials.

Detersive ingredients or adjuncts optionally included in the instant compositions can include one or more materials for assisting or enhancing cleaning performance, treatment of the substrate to be cleaned, or designed to improve the aesthetics of the compositions. Adjuncts which can also be included in compositions of the present invention, at their conventional art-established levels for use (generally, adjunct materials comprise, in total, from about 30% to about 99.9%, preferably from about 70% to about 95%, by weight of the compositions), include other active ingredients such as phosphate and non-phosphate builders, chelants, enzymes, dispersant polymers (e.g., from BASF Corp. or Rohm & Haas), color speckles, silvercare, anti-tarnish and/or anti-corrosion agents, silicates, dyes, fillers, germicides, alkalinity sources, hydrotropes, anti-oxidants, enzyme stabilizing agents, perfumes, solubilizing agents, carriers, processing aids, pigments, and pH control agents.

Depending on whether a greater or lesser degree of compactness is required, filler materials can also be present in the instant compositions. These include sucrose, sucrose esters, sodium sulfate, potassium sulfate, etc., in amounts up to about 70%, preferably from 0% to about 40% of the composition. Preferred filler is sodium sulfate, especially in good grades having at most low levels of trace impurities.

Sodium sulfate used herein preferably has a purity sufficient to ensure it is non-reactive with bleach; it may also be treated with low levels of sequestrants, such as phosphonates or EDDS in magnesium-salt form. Note that preferences, in terms of purity sufficient to avoid decomposing bleach, applies also to pH-adjusting component ingredients, specifically including any silicates used herein.

The compositions of the invention can optionally contain an alkyl phosphate ester suds suppressor, a silicone suds suppressor, or combinations thereof. Levels in general are from 0% to about 10%, preferably, from about 0.001% to about 5%. However, generally (for cost considerations and/or deposition) preferred compositions herein do not comprise suds suppressors, that is they are totally free of them, or comprise suds suppressors only at low levels, e.g., less than about 0.1% of active suds suppressing agent.

Hydrotrope materials such as sodium benzene sulfonate, sodium toluene sulfonate, sodium cumene sulfonate, etc., can be present, e.g., for better dispersing surfactant.

Bleach-stable perfumes (stable as to odor); and bleach-stable dyes such as those disclosed in U.S. Pat. No. 4,714,562, Roselle et al, issued Dec. 22, 1987 can also be added to the present compositions in appropriate amounts.

Since the compositions can contain water-sensitive ingredients or ingredients which can co-react when brought together in an aqueous environment, it is desirable to keep the free moisture content at a minimum, e.g., 7% or less, preferably 5% or less of the compositions; and to provide packaging which is substantially impermeable to water and carbon dioxide. Coating measures may be employed to protect the ingredients from each other and from air and moisture. Plastic bottles, including refillable or recyclable types, as well as conventional barrier cartons or boxes are another helpful means of assuring maximum shelf-storage stability. As noted, when ingredients are not highly compatible, it may further be desirable to coat at least one such ingredient with a low-foaming nonionic surfactant for protection. There are numerous waxy materials which can readily be used to form suitable coated particles of any such otherwise incompatible components; however, the formulator prefers those materials which do not have a marked tendency to deposit or form films on dishes including those of plastic construction.

The following nonlimiting examples further illustrate compositions of the present invention.

Example 4

An automatic dishwashing detergent composition is prepared as follows:

|  | Weight % | |
| --- | --- | --- |
| Ingredients: | A | B |
| Sodium Tripolyphosphate (STPP) | 24.0 | 45 |
| Sodium carbonate | 20.0 | 13.5 |
| Hydrated 2.0r silicate | 15 | 13.5 |
| Nonionic surfactants[1] | 2.0 | 2.0 |
| Tergitol 15S9 Nonionic surfactant[2] | 1.0 | 1.0 |
| Polymer[3] | 4.0 | — |
| Protease (4% active) | 0.83 | 0.83 |
| Amylase (0.8% active) | 0.5 | 0.5 |
| Perborate monohydrate (15.5% Active AvO)[4] | 14.5 | 14.5 |
| Cobalt catalyst[5] | 0.008 | — |
| Water, sodium sulfate and misc. | Balance | Balance |

[1]Ether-capped poly(oxyalkylated) alcohol of EXAMPLE 1C
[2]Ethoxylated secondary alcohol supplied by Union Carbide (cloud point = 60° C.).
[3]Terpolymer selected from either 60% acrylic acid/20% maleic acid/20% ethyl acrylate, or 70% acrylic acid/10% maleic acid/20% ethyl acrylate.
[4]The AvO level of the above formula is 2.2%.
[5]Pentaamineacetatocobalt(III) nitrate.

The ADD's of the above dishwashing detergent composition examples may be used to wash lipstick-stained plastic and ceramic, tea-stained cups, starch-soiled and spaghetti-soiled dishes, milk-soiled glasses, starch, cheese, egg or babyfood-soiled flatware, and tomato-stained plastic spatulas by loading the soiled dishes in a domestic automatic dishwashing appliance and washing using either cold fill, 60° C. peak, or uniformly 45–50° C. wash cycles with a product concentration of the exemplary compositions of from about 1,000 to about 10,000 ppm, with excellent results.

The following examples further illustrate phosphate built ADD compositions which contain a bleach/enzyme particle, but are not intended to be limiting thereof. All percentages noted are by weight of the finished compositions, other than the perborate (monohydrate) component, which is listed as AvO.

Examples 5–6

|  | 5 | 6 |
|---|---|---|
| Catalyst[1] | 0.008 | 0.004 |
| Savinase ™ 12T | — | 1.1 |
| Protease D | 0.9 | — |
| Duramyl ™ | 1.5 | 0.75 |
| STPP | 31.0 | 30.0 |
| Na$_2$CO$_3$ | 20.0 | 30.5 |
| Polymer[2] | 4.0 | — |
| Perborate (AvO) | 2.2 | 0.7 |
| Dibenzoyl Peroxide | 0.2 | 0.15 |
| 2 R Silicate (SiO$_2$) | 8.0 | 3.5 |
| Paraffin | 0.5 | 0.5 |
| Benzotriazole | 0.3 | 0.15 |
| Nonionic surfactant[3] | 1.0 | 1.0 |
| Sodium Sulfate, Moisture | Balance | |

[1]Pentaamineacetatocobalt (III) nitrate; may be replaced by MnTACN.
[2]Polyacrylate or Acusol 480N or polyacrylate/polymethacrylate copolymers.
[3]A nonionic surfactant prepared according to EXAMPLE 2C.

In Compositions of Examples 6 and 7, respectively, the catalyst and enzymes are introduced into the compositions as 200–2400 micron composite particles which are prepared by spray coating, fluidized bed granulation, marumarizing, prilling or flaking/grinding operations. If desired, the protease and amylase enzymes may be separately formed into their respective catalyst/enzyme composite particles, for reasons of stability, and these separate composites added to the compositions.

Examples 7–8

Granular dishwashing detergents are as follows:

|  | 7 | 8 |
|---|---|---|
| Composite Particle | 1.5 | 0.75 |
| Savinase ™ 12T | 2.2 | — |
| Protease D | — | 0.45 |
| STPP | 34.5 | 30.0 |
| Na$_2$CO$_3$ | 20.0 | 30.5 |
| Acusol 480N | 4.0 | — |
| Perborate (AvO) | 2.2 | 0.7 |
| 2 R Silicate (SiO$_2$) | 8.0 | 3.5 |
| Paraffin | — | 0.5 |
| Benzotriazole | — | 0.15 |
| Nonionic surfactant[1] | 1.0 | 1.0 |
| LF404[2] | 1.0 | 0.75 |
| Sodium Sulfate, Moisture | to balance | |

[1]Prepared according to EXAMPLE 3.
[2]A blend of ethoxylated/propoxylated nonionic surfactants available from BASF.

Example 9

Light-duty liquid dishwashing detergent formulae are prepared as follows:

|  | Composition | | |
|---|---|---|---|
|  | A | B | C |
| Ingredient | % Weight | | |
| Surfactant[1] | 1.00 | 2.00 | 1.50 |
| AES | 32.00 | 33.00 | 29.00 |
| Amine Oxide Surfactant | 5.00 | 4.50 | 6.00 |
| Betaine Surfactant | 3.00 | 5.00 | 1.75 |
| Perfume | 0.18 | 0.18 | 0.18 |
| Water and minors | Balance | | |

[1]Prepared according to EXAMPLE 1D

Example 10

An automatic dishwashing detergent tablet is prepared from the composition as follows:

|  | Weight % | |
|---|---|---|
| Ingredients: | A | B |
| Sodium Tripolyphosphate (STPP) | 50.0 | 47.0 |
| Sodium carbonate | 14.0 | 15 |
| Hydrated 2.0r silicate | 8.0 | 5.0 |
| Nonionic surfactant[1] | 0.4 | 2.0 |
| Tergitol 15S9 Nonionic surfactant[2] | 1.0 | 1.0 |
| Polymer[3] | 4.0 | — |
| Protease (4% active) | 2.0 | 1.50 |
| Amylase (0.8% active) | — | 0.5 |
| Perborate monohydrate (15.5% Active AvO)[4] | 1.5 | 1.5 |
| Cobalt catalyst[5] | 0.008 | — |
| TAED | — | 2.2 |
| Benzotriazole | 0.3 | — |
| Paraffin Oil[6] | 0.5 | — |
| Water, sodium sulfate and misc. | Balance | Balance |

[1]Ether-capped poly(oxyalkylated) alcohol of EXAMPLE 2E
[2]Ethoxylated secondary alcohol supplied by Union Carbide (cloud point = 60° C.).
[3]Polyacrylate polymer blended with HEDP.
[4]The AvO level of the above formula is 2.2%.
[5]Pentaamineacetatocobalt(III) nitrate.
[6]Winog 70 available from Wintershall, Salzbergen, Germany.

The ADD's of the above dishwashing detergent composition examples may be used to wash lipstick-stained plastic and ceramic, tea-stained cups, starch-soiled and spaghetti-soiled dishes, milk-soiled glasses, starch, cheese, egg or babyfood-soiled flatware, and tomato-stained plastic spatulas by loading the soiled dishes in a domestic automatic dishwashing appliance and washing using either cold fill, 60° C. peak, or uniformly 45–50° C. wash cycles with a product concentration of the exemplary compositions of from about 1,000 to about 10,000 ppm, with excellent results.

Example 11

A hard surface cleaning composition according to the present invention is illustrated as follows

|  | Weight % | | | | | |
|---|---|---|---|---|---|---|
| Ingredients | A | B | C | D | E | F |
| Surfactant[1] | 0.25 | 3.5 | 5.5 | 6.5 | 6.1 | 9.5 |
| Sodium hypochlorite | 0.9 | 1.4 | 1.4 | — | — | — |
| Calcium hypochlorite | — | — | — | 0.5 | — | — |
| Sodium dichlorocyanurate | — | — | — | — | 1.2 | 2.0 |

-continued

| Ingredients | Weight % | | | | | |
|---|---|---|---|---|---|---|
| | A | B | C | D | E | F |
| Tetrapotassium pyrophos. | 6.0 | — | — | — | 13.0 | — |
| Tripotassium phosphate | 2.0 | — | — | — | 12.0 | — |
| Sodium tripolyphosphate | — | — | — | 1.6 | — | — |
| Calcium carbonate | — | — | — | — | 39.0 | 1.1 |
| Calcium oxide | — | — | — | — | 2.8 | — |
| Perlite abrasive | 6.5 | — | — | — | 22.5 | 0.5 |
| Sodium hydroxide | 0.8 | 1.6 | 1.8 | 0.8 | 1.1 | 1.0 |
| Potassium hydroxide | — | — | — | 0.85 | — | — |
| Dyes | 0.75 | 0.28 | 0.28 | 0.28 | — | — |
| Lanolin | — | — | — | — | — | 2.1 |
| Carboxymethylcellulose | — | — | — | — | — | 2.6 |
| Water/Misc. | bal. | bal. | bal. | bal. | bal. | bal. |

[1]Ether-capped poly(oxyalkylated) alcohol of EXAMPLE 2E.

Example 12

Liquid gel-like automatic dishwashing detergent compositions according to the present invention as prepared as followed:

| | A | B |
|---|---|---|
| STPP builder | 17.5 | 16 |
| K carbonate | 8 | — |
| Na carbonate | — | 1.5 |
| K hydroxide | 2 | 2.0 |
| K silicate | 4 | 1.5 |
| Na silicate | 2 | 3 |
| thickener | 1 | 1 |
| Nitric acid | 0.02 | 0.02 |
| Al tristearate | 0.1 | — |
| polymer dispersant[2] | 0.5 | — |
| Na benzoate | 0.8 | 0.5 |
| Surfactant[1] | 1.0 | 2.0 |
| Perborate | | 2.2 |
| Na hypochlorite | 1.5 | — |
| Water and Minors | balance | balance |

[1]Ether-capped poly(oxyalkylated) alcohol of EXAMPLE 2F
[2]sodium polyacrylate of 4500 m.w.

What is claimed is:

1. A process for preparing an ether-capped poly(oxyalkylated) alcohol surfactant having the formula $$R^1O[CH_2CH(R^3)O]_xCH_2CH(OH)CH_2OR^2$$

wherein $R^1$ and $R^2$ are linear or branched, saturated or unsaturated, aliphatic or aromatic hydrocarbon radicals having from 1 to about 30 carbon atoms; $R^3$ is H, or a linear aliphatic hydrocarbon radical having from 1 to about 4 carbon atoms; x is an integer having an average value from 1 to about 30; further wherein $R^2$ can optionally be alkoxylated, wherein said alkoxy group is selected from the group consisting of ethoxy, propoxy, butoxy and mixtures thereof; said process comprising the steps of:

(a) providing a glycidyl ether having the formula:

wherein $R^2$ is defined as above;

(b) providing an ethoxylated alcohol having the formula:

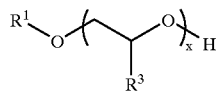

wherein $R^1$, $R^3$ and x are defined as above;

(c) reacting said glycidyl ether with said ethoxylated alcohol to form said surfactant in the presence of a metallic catalyst;

(d) said surfactant is sparged with an inert gas; and (e) extracting said catalyst from said surfactant by at least one aqueous extraction with an aqueous solution, wherein said aqueous solution is selected from the group consisting of a from about 2% to about 15% by weight aqueous solution of sodium carbonate, a from about 2% to about 10% by weight aqueous solution of potassium carbonate, a from about 1% to about 22% by weight aqueous solution of sodium sulfate, a from about 2% to about 6% by weight aqueous solution of sodium bicarbonate, a from about 1% to about 10% by weight aqueous solution of potassium sulfate, a from about 2% to about 24% by weight aqueous solution of potassium bicarbonate, and mixtures thereof; and wherein said surfactant, after said at least one aqueous extraction, contains less than about 100 ppm of the metallic component of said metallic catalyst.

2. The process as claimed in claim 1 wherein when x is about 2 or greater, $R^3$ may be the same or different.

3. The process as claimed in claim 1 wherein when x is about 15 or greater and when $R^3$ is selected from H and methyl, then at least four of the $R^3$ groups are methyl radicals; further wherein when x is about 15 or greater and when $R^3$ is selected from H and from 1 to 3 methyl groups, then at least one $R^3$ is ethyl, propyl or butyl.

4. The process as claimed in claim 1 wherein $R^1$ and $R^2$ are a linear or branched, saturated or unsaturated, aliphatic hydrocarbon radical having from about 6 to about 22 carbon atoms.

5. The process as claimed in claim 1 wherein x is an integer having an average value of from about 6 to about 15.

6. The process as claimed in claim 1 wherein said metallic catalyst is a Lewis acid selected from the group consisting of $SnCl_4$, $TiCl_4$, $Ti(O^iPr)_4$, $ZnCl_2$, $SnCl_2$, $FeCl_3$, $BF_3$, $AlCl_3$, and mixtures thereof.

7. The process as claimed in claim 6 wherein said metallic catalyst is a Lewis acid selected from the group consisting of $SnCl_4$, $BF_3$, $AlCl_3$, and mixtures thereof.

8. The process as claimed in claim 1 wherein said surfactant after said aqueous extraction contains less than about 70 ppm of the metallic component of said metallic catalyst.

9. The process as claimed in claim 1 wherein said surfactant is sparged with an inert gas, under vacuum in the range of 5 to 500 mmHg.

10. The process as claimed in claim 1 wherein said catalyst is a Lewis acid catalyst and said step of reacting glycidyl ether with ethoxylated alcohol is conducted at a temperature of from about 50° C. to about 95° C.

11. The process as claimed in claim 10 wherein said temperature ranges from about 60° C. to about 80° C.

12. The process as claimed in claim 1 wherein said step of providing said glycidyl ether further comprises the step of reacting a linear or branched, aliphatic or aromatic alcohol having the formula $R^2OH$ and an epoxide having the formula:

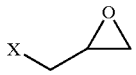

wherein $R^2$ is defined as above and X is a leaving group.

13. The process as claimed in claim 1 wherein said catalyst is a Lewis acid catalyst and said catalyst is employed at levels of from about 0.1 mol % to about 2.0 mol %.

14. The process as claimed in claim 13 wherein said step of reacting a linear alcohol with an epoxide is conducted in the absence of a solvent.

15. The process as claimed in claim 13 wherein said step of reacting a linear alcohol with an epoxide is conducted at about 40° C. to about 90° C.

16. A process for preparing an ether-capped poly (oxyalkylated) alcohol having the formula $$R^1O[CH_2CH(R^3)O]_xCH_2CH(OH)CH_2OR^2$$

wherein $R^1$ and $R^2$ are linear or branched, saturated or unsaturated, aliphatic or aromatic hydrocarbon radicals having from 1 to about 30 carbon atoms; $R^3$ is H, or a linear aliphatic hydrocarbon radical having from 1 to about 4 carbon atoms; x is an integer having an average value from about 6 to about 15; further wherein $R^2$ can optionally be alkoxylated, wherein said alkoxy group is selected from the group consisting of ethoxy, propoxy, butoxy and mixtures thereof; said process comprising the steps of:

(a) forming a glycidyl ether having the formula:

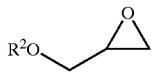

wherein $R^2$ is defined as above by reacting a linear or branched, aliphatic or aromatic alcohol having the formula $R^2OH$ and an epoxide having the formula:

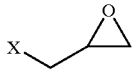

wherein $R^2$ is defined as above and X is a leaving group;

(b) providing an ethoxylated alcohol having the formula:

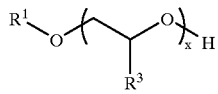

wherein $R^1$, $R^3$ and x are defined as above; and (c) reacting said glycidyl ether with said ethoxylated alcohol to form said surfactant in the presence of a metallic catalyst;

(d) said surfactant is sparged with an inert gas; and (e) extracting said catalyst from said surfactant by at least one aqueous extraction with an aqueous solution, wherein said aqueous solution is selected from the group consisting of a from about 2% to about 15% by weight aqueous solution of sodium carbonate, a from about 2% to about 10% by weight aqueous solution of potassium carbonate, a from about 1% to about 22% by weight aqueous solution of sodium sulfate, a from about 2% to about 6% by weight aqueous solution of sodium bicarbonate, a from about 1% to about 10% by weight aqueous solution of potassium sulfate, a from about 2% to about 24% by weight aqueous solution of potassium bicarbonate, and mixtures thereof; and wherein said surfactant, after said at least one aqueous extraction, contains less than about 100 ppm of the metallic component of said metallic catalyst.

17. The process as claimed in claim 1 wherein when x is about 6 or greater, $R^3$ may be the same or different.

18. The process as claimed in claim 1 wherein when x is about 15 and when $R^3$ is selected from H and methyl, then at least four of the $R^3$ groups are methyl radicals; further wherein when x is about 15 and when $R^3$ is selected from H and from 1 to 3 methyl groups, then at least one $R^3$ is ethyl, propyl or butyl.

19. The process as claimed in claim 16 wherein said surfactant after said aqueous extraction contains less than about 70ppm of the metallic component of said metallic catalyst.

20. The process as claimed in claim 16 wherein said step of reacting glycidyl ether with ethoxylated alcohol is conducted at a temperature of from about 50° C. to about 95° C.

21. The process as claimed in claim 16 wherein said metallic catalyst is a Lewis acid selected from the group consisting of $SnCl_4$, $TiCl_4$, $Ti(O^1Pr)_4$, $ZnCl_2$, $SnCl_2$, $FeCl_3$, $BF_3$, $AlCl_3$, and mixtures thereof.

22. The process as claimed in claim 16 wherein said metallic catalyst is a Lewis acid selected from the group consisting of $SnCl_4$, $BF_3$, $AlCl_3$, and mixtures thereof.

* * * * *